US010525852B2

(12) United States Patent
Ma

(10) Patent No.: US 10,525,852 B2
(45) Date of Patent: Jan. 7, 2020

(54) SEAT ARRANGEMENT FOR A VEHICLE

(71) Applicant: LEAR CORPORATION, Southfield, MI (US)

(72) Inventor: Jianliang Ma, Shanghai (CN)

(73) Assignee: Lear Corporation, Southfield, MI (US)

( * ) Notice: Subject to any disclaimer, the term of this patent is extended or adjusted under 35 U.S.C. 154(b) by 593 days.

(21) Appl. No.: 15/271,584

(22) Filed: Sep. 21, 2016

(65) Prior Publication Data

US 2018/0079333 A1    Mar. 22, 2018

(51) Int. Cl.
*B60N 2/30*    (2006.01)

(52) U.S. Cl.
CPC ........... *B60N 2/3065* (2013.01); *B60N 2/309* (2013.01); *B60N 2/3013* (2013.01)

(58) Field of Classification Search
CPC ..... B60N 2/3065; B60N 2/3013; B60N 2/309
USPC .............................................. 297/341, 367 R
See application file for complete search history.

(56) References Cited

U.S. PATENT DOCUMENTS

| 5,340,196 | A  | * | 8/1994 | Ikegaya | ............... | B60N 2/2352 |
|   |   |   |   |   |   | 297/367 X |
| 7,201,425 | B2 |   | 4/2007 | Tsujibayashi et al. |   |   |
| 7,404,605 | B2 |   | 7/2008 | Inoue et al. |   |   |
| 8,360,496 | B2 |   | 1/2013 | Farcas et al. |   |   |
| 8,439,445 | B2 |   | 5/2013 | Perkins |   |   |
| 2009/0001795 | A1 | * | 1/2009 | Homier | .................... | B60N 2/22 |
|   |   |   |   |   |   | 297/341 X |
| 2010/0052391 | A1 | * | 3/2010 | Hurst, III | ............. | B60N 2/3031 |
|   |   |   |   |   |   | 297/341 |
| 2010/0244524 | A1 | * | 9/2010 | Kumazaki | ................ | B60N 2/12 |
|   |   |   |   |   |   | 297/341 |

FOREIGN PATENT DOCUMENTS

| FR | 2884771 B1 | 10/2008 |
| JP | 4136677 B2 | 6/2008 |

* cited by examiner

*Primary Examiner* — Anthony D Barfield
(74) *Attorney, Agent, or Firm* — Brooks Kushman P.C.

(57) ABSTRACT

A seat arrangement for a vehicle includes first and second mounting brackets configured for attachment to a vehicle body. A seat back frame is attached to the first mounting bracket and is pivotable relative to the first mounting bracket around a first pivot axis. A seat cushion frame is pivotably attached to the second mounting bracket, and attached to the seat back frame such that the seat cushion frame and the seat back frame are pivotable relative to each other around a second pivot axis positioned above the first pivot axis when the seat back frame is in a use position.

18 Claims, 4 Drawing Sheets

SEAT ARRANGEMENT FOR A VEHICLE

TECHNICAL FIELD

The present disclosure relates to a seat arrangement for a vehicle.

BACKGROUND

There are many different types of vehicle seating systems, and they offer a wide array of features. Some of these features may be dictated by customer preferences, while others may be dictated by manufacturing considerations or a variety of other factors. Examples of various vehicle seating systems are found in the following patent references: U.S. Pat. Nos. 8,439,445, 8,360,496, 7,404,605, 7,201,425, JP4136677 and FR2884771.

SUMMARY

Embodiments described herein may include a seat arrangement for a vehicle having first and second mounting brackets configured for attachment to a vehicle body. A seat back frame may be attached to the first mounting bracket and may be pivotable relative to the first mounting bracket around a first pivot axis. A seat cushion frame may be pivotably attached to the second mounting bracket, and attached to the seat back frame such that the seat cushion frame and the seat back frame are pivotable relative to each other around a second pivot axis positioned above the first pivot axis when the seat back frame is in a use position.

Embodiments described herein may include a seat arrangement for a vehicle having a first mounting bracket configured for attachment to a vehicle body. A seat back frame may be pivotably attached to the first mounting bracket at a first pivot axis, and a seat cushion frame may be pivotably attached to the seat back frame at a second pivot axis such that the seat cushion frame moves forward in response to the seat back frame being pivoted forward around the first pivot axis.

Embodiments described herein may include a seat arrangement for a vehicle having a first mounting bracket configured for attachment to a vehicle body. A seat back frame may be attached to the first mounting bracket and pivotable relative to the first mounting bracket around a first pivot axis. The seat arrangement may also include a second mounting bracket configured for attachment to the vehicle body, and a seat cushion frame having first and second ends. The second end of the seat cushion frame may be pivotably attached to the second mounting bracket and the first end may be pivotably attached to the seat back frame at a second pivot axis. The second pivot axis may be positioned rearward of the first pivot axis when the seat back frame is in a use position and positioned forward of the first pivot axis when the seat back frame is in a forward folded-down position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
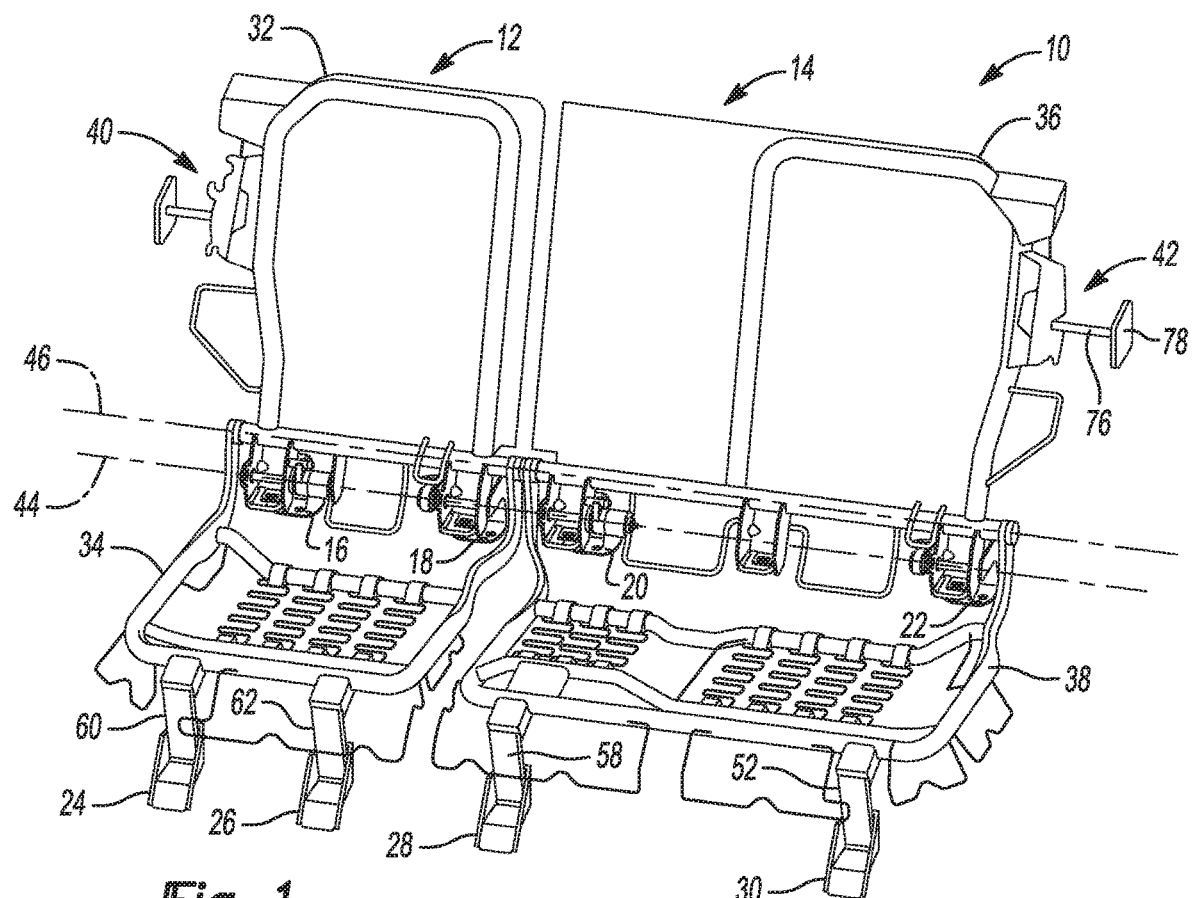
FIG. 1 shows a seat arrangement for a vehicle in accordance with embodiments described herein.

FIG. 1 shows a seat arrangement 10 for a vehicle in accordance with embodiments described herein. The seat arrangement 10 is a split-bench seat and includes a first seat portion 12 and a second seat portion 14. The first seat portion 12 includes a pair of first mounting brackets 16, 18 that are configured for attachment to a vehicle body, for example, the vehicle floor. Similarly, the second seat portion 14 includes first mounting brackets 20, 22. Each of the seat portions 12, 14 also includes second mounting brackets 24, 26 and 28, 30, respectively. The first seat portion 12 includes a seat back frame 32 and a seat cushion frame 34. Similarly, the second seat portion 14 includes a seat back frame 36 and a seat cushion frame 38. As described in more detail below, each of the seat portions 12, 14 includes a seat back latch arrangement 40, 42, which, as shown in FIG. 1, are holding their respective seat backs 32, 36 in a use position.

As shown in FIG. 1, the seat back frame 32 is attached to both of the first mounting brackets 16, 18 and is pivotable relative to the first mounting brackets 16, 18 around a first pivot axis 44. Similarly, the seat back frame 36 is attached to and pivotable relative to both of its first mounting brackets 20, 22 around the first pivot axis 44. The seat cushion frame 34 of the first seat portion 12 is pivotably attached to the second mounting brackets 24, 26, and is also attached to the seat back frame 32 such that the seat cushion frame 34 and the seat back frame 32 are pivotable relative to each other around a second pivot axis 46, which is positioned above the first pivot axis 44 when the seat back frame 32 is in a use position such as shown in FIG. 1. Similarly, the seat cushion frame 38 of the second seat portion 14 is pivotably attached to its second mounting brackets 28, 30, and is also attached to its seat back frame 36 such that it is pivotable relative to the seat back frame 36 around the second pivot axis 46.

Figure 2:
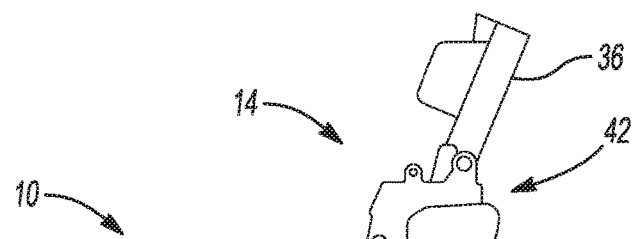
FIG. 2 shows a side view of the seat arrangement shown in FIG. 1.
Figure 2:
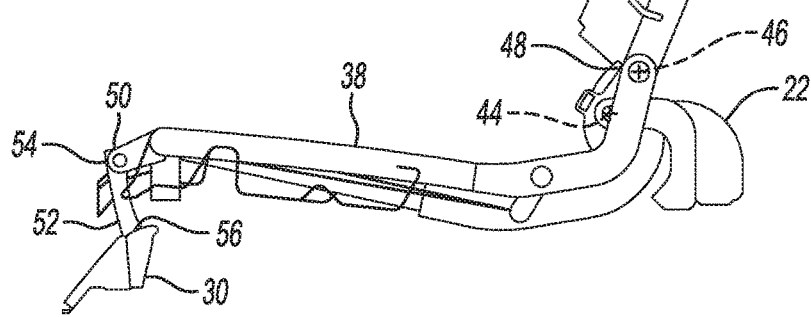

FIG. 2 shows a side view of the seat arrangement 10, and more particularly, a side view of the second seat portion 14. As shown in FIG. 2, the seat cushion frame 38 has first and second ends 48, 50. The first end 48 is pivotably attached to the seat back frame 36 at the second pivot axis 46. The seat arrangement 10 is facing forward relative to its orientation in a vehicle, so that as shown in FIG. 2 the second pivot axis 46, in addition to being positioned above the first pivot axis 44, is also positioned rearward of the first pivot axis 44 when the seat back 36 is in a use position such as illustrated in FIG. 2. As explained in more detail below, having the first pivot axis 44 positioned below the second pivot axis 46 facilitates a forward movement of the seat cushion frame 38 as the seat back frame 36 is folded down. The second end 50 of the seat cushion frame 38 is pivotably attached to the second mounting bracket 30 via a link 52. The link 52 has a first end 54 pivotably attached to the seat cushion frame 38, and a second end 56 pivotably attached to the second mounting bracket 30. As shown in FIG. 1, the other second mounting bracket 28 is pivotably connected to the seat cushion frame 38 through another link 58. Similarly, the seat cushion frame 34 of the first seat portion 12 is pivotably connected to its second mounting brackets 24, 26 through links 60, 62.

Figure 3A:
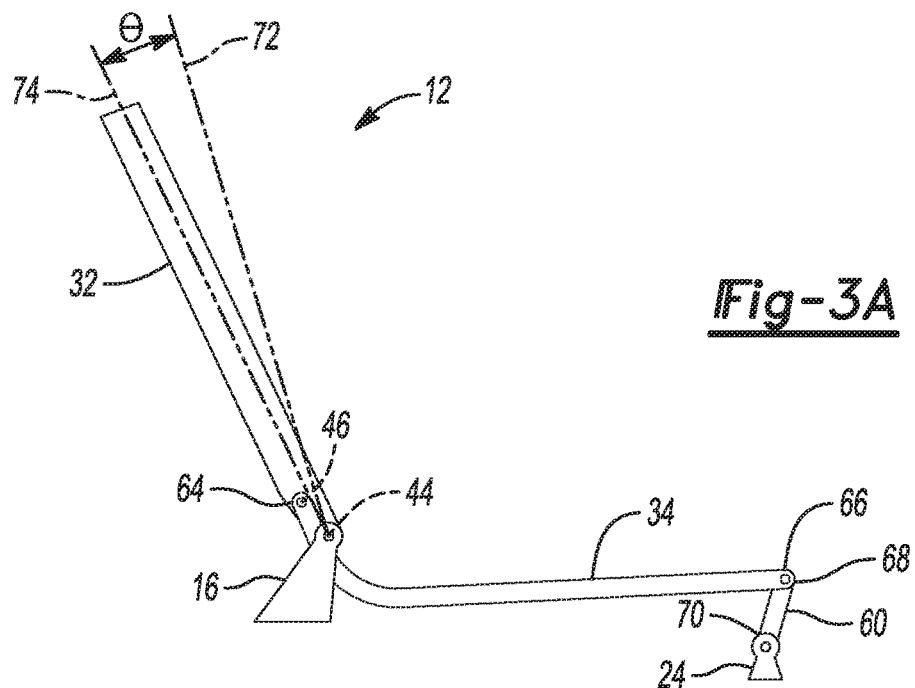
FIGS. 3A-3C show schematic side view representations of the seat arrangement in a use position and being folded forward to a folded-down position.
Figure 3B:
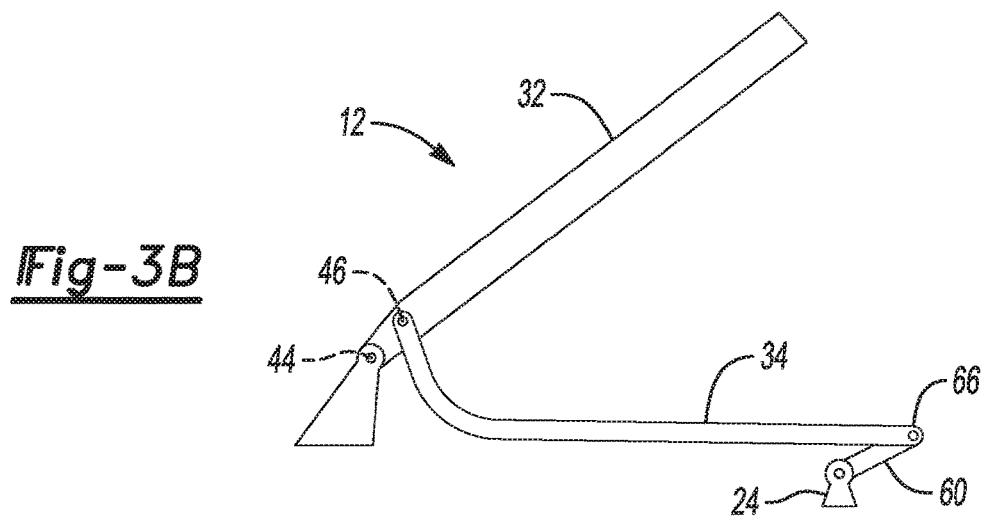
Figure 3C:
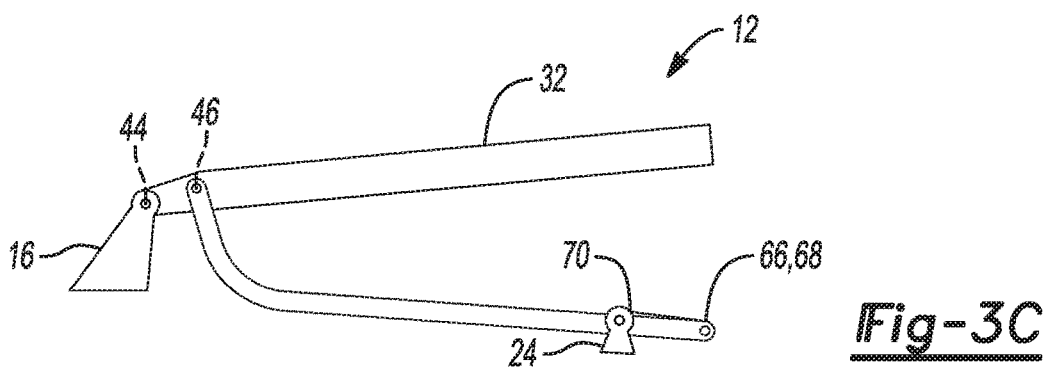

FIGS. 1 and 2 show various elements and connection relationships between them for the seat arrangement 10. In particular, FIGS. 1 and 2 also show the connections between the seat back frames 32, 36, their respective seat cushion frames 34, 38, and the connection of the seat arrangement 10 to a vehicle body through the mounting brackets 16-30. FIGS. 3A-3C illustrate schematically that the seat arrangement 10 provides two different use positions and can be folded forward to provide a cargo-storage position without the need for complex connection arrangements with many connecting elements. The seat cushion frame 34 includes a first end 64 and a second end 66. The first end 64 is pivotably attached to the seat back frame 32 at the second pivot axis 46. The second and 66 is pivotably attached to the second mounting bracket 24 through the link 60. The link 60 has a first end 68 pivotably attached to the second end 66 of the seat cushion frame 34. The link 60 also has a second end 70 pivotably attached to the second mounting bracket 24.

The seat back frame 32 has two use positions: a first use position illustrated in FIG. in 1 and 2, and as illustrated by the position of the dashed line 72 in FIG. 3A. The seat back frame 32 also has a second use position where it is reclined rearward of the first use position; this is shown by the dashed line 74 and the position of the seat back frame 32 as shown in FIG. 3A. As explained in more detail below, the latch arrangement 40 provides a mechanism for locking the seat back frame 32 into the two different use positions. The angular difference between the first use position 72 and the second use position 74 is labeled theta (θ) in FIG. 3A. The angle (θ) may vary depending on the particular configuration of a latch arrangement, such as the latch arrangement 40. In some embodiments, (θ) may be an angle chosen to be anywhere in a range between 3° and 10°, while in other embodiments it may be an angle between 4° and 7°, and in still other embodiments may be chosen to be approximately 5.5°. Because the two seat arrangement portions 12, 14 are generally parallel in structure, descriptions of the various connections and latch positions described in detail in regard to one of them also applies to the other unless stated to the contrary.

As shown in FIG. 3A, the first end 68 of the link 60 is positioned above the second end 70 when the seat back frame 32 is in either of the two use positions, indicated by dashed lines 72, 74. FIG. 3B shows the seat back frame 32 as it is being pivoted forward. A comparison of the positions of the elements in FIGS. and 3A and 3B shows that the seat cushion frame 34 moves linearly relative to the second mounting bracket 24 when the seat back frame 32 is pivoted forward around the first pivot axis 44. In addition, because the second end 66 of the seat cushion frame 34 is attached to the link 60, the second end 66 also rotates around the second mounting bracket 24 as the seat back frame 32 is pivoted between either use position 72 or 74 and the forward folded-down position, which is described in more detail in conjunction with FIG. 3C.

FIG. 3C shows the seat back frame 32 in a forward folded-down position, which may be conveniently used for cargo storage, for example. As shown in FIG. 3C, the second pivot axis 46 is now in a position that is forward of the first pivot axis 44. The first end 68 of the link 60 was positioned above the second end 70 when the seat back frame 32 was in the use position as shown in FIG. 3A; however, with the seat back frame 32 folded down, the first end 68 is positioned lower than the second end 70. Thus, the seat cushion frame 34 is angled slightly downward from back to front when the seat back frame 32 is in the folded-down position.

Figure 4A:
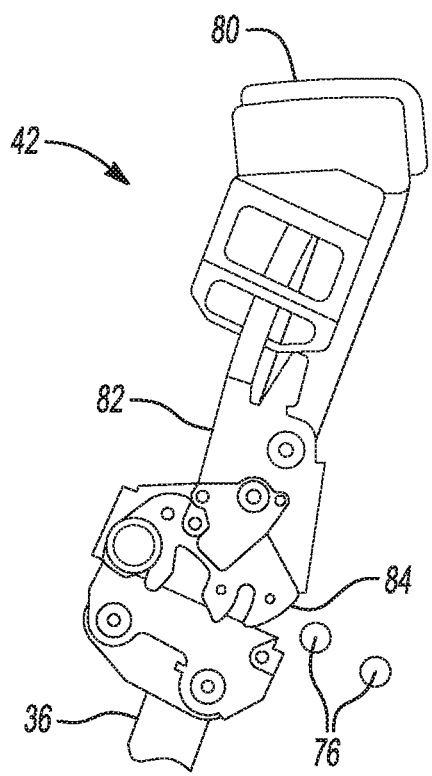
FIGS. 4A-4C show a seat back latch arrangement in a release position and in first and second locked positions.
Figure 4B:
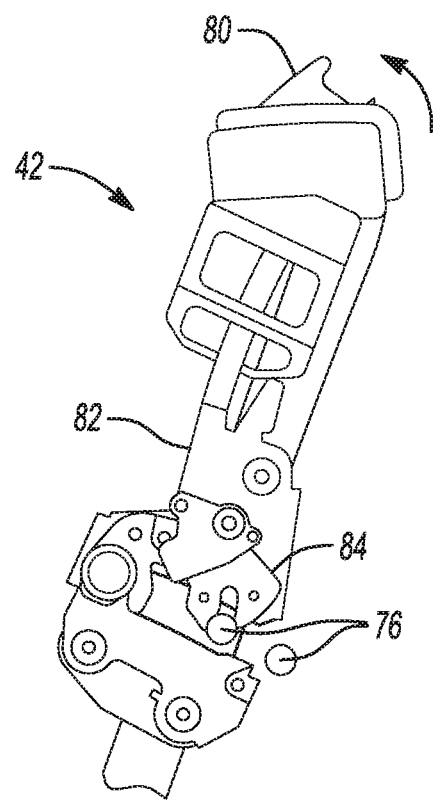
Figure 4C:
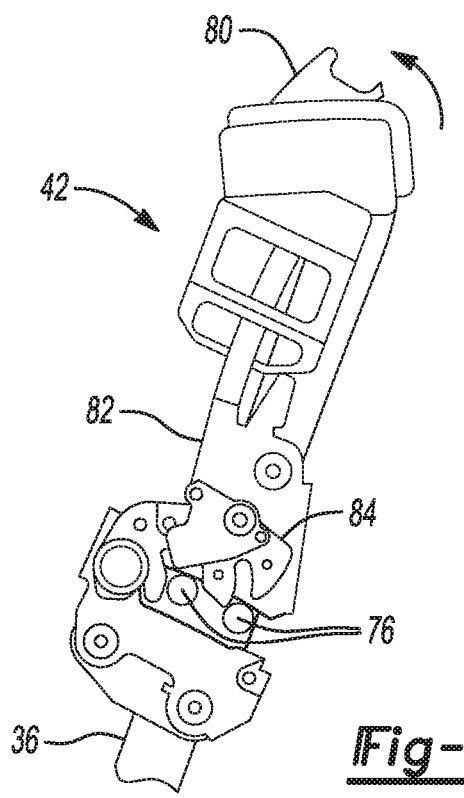

As described above with regard to FIG. 1, the seat back frame 32 is locked into its use positions 72, 74 by a latch arrangement 40. Similarly, the seat back frame 36 is locked into its use positions by a latch arrangement 42. The latch arrangement 42 includes a striker 76, which may be mounted to a portion of a vehicle frame, for example, through a mounting bracket 78. The striker 76 may be in the form of a "U-shaped" rod that works in conjunction with a latch hook to secure the seat back frame 36. FIGS. 4A-4C illustrate the latch arrangement 42 in more detail. Specifically, FIG. 4A shows the latch arrangement 42 in a release or free position. In this position, the seat back frame 36 is free to pivot forward to the folded-down position or back to a use position. A release handle 80 is provided for a vehicle operator to engage or disengage the latch arrangement 42.

More specifically, the release handle 80 is connected to a Bowden cable 82, which itself is connected to a latch hook 84. Lifting a portion of the latch handle 80 upward, as shown in FIG. 4B and as indicated by the directional arrow, tensions the Bowden cable 82 and causes the latch hook 84 to rotate. This allows a first portion of the striker 76 to be captured by the latch hook 84. Release of the release handle 80 secures the latch hook 84 to the striker 76 and the seat back frame 36 is in the first use position. Lifting the latch handle 80 as shown in FIG. 4C again tensions the Bowden cable 82 and allows the seat back frame 36 to be pivoted in either direction around the first pivot axis 44. In FIG. 4C, the seat back frame 36 is being pivoted from the first use position to the second use position, where the latch hook 84 will engage with a second portion of the striker 76. Release of the release handle 80 in this position will allow the seat back frame 36 to be locked in the second use position, which is reclined rearward from the first use position shown in FIG. 4B.

Figure 5:
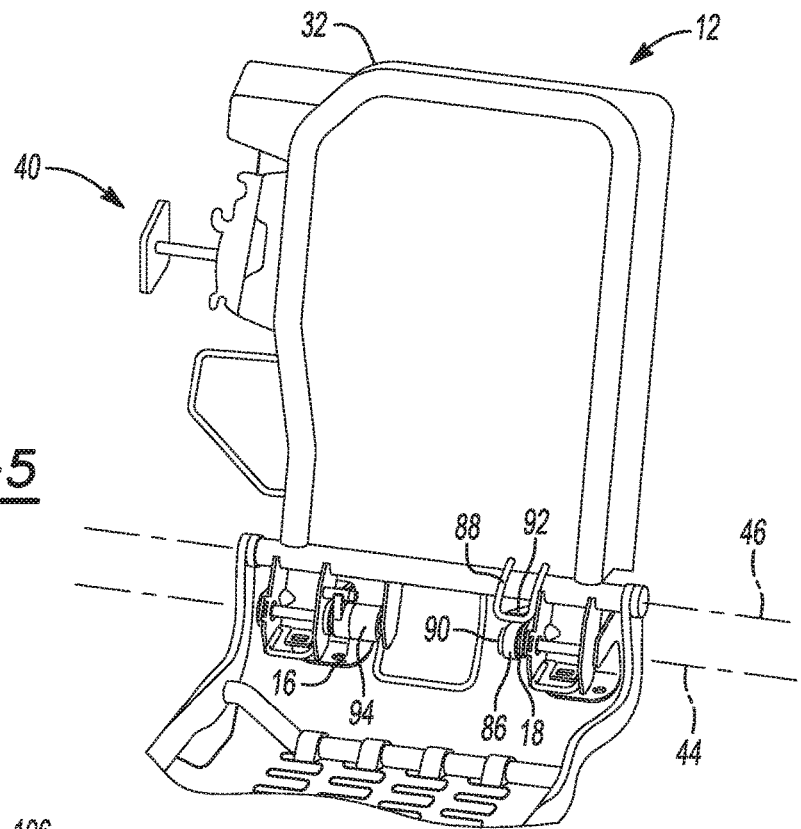
FIG. 5 shows a portion of the seat arrangement including a spring and damper arrangement.

In order to assist with movement of the seat back frame 32 from the use position into the forward folded-down position, the seat arrangement 10 may also include a spring and damper system. FIG. 5 shows the first seat portion 12 of the seat arrangement 10, and illustrates the spring and damper arrangement. More specifically, a torsional biasing member 86 is connected between a bracket 88 on the seat back frame 32 and the first mounting bracket 18. As shown in FIG. 5, the torsional biasing member 86 is configured as a flat torsional spring, which is mounted to a rod 90 secured to the first mounting bracket 18. A free end 92 of the spring 86 is attached to the bracket 88 on the seat back frame 32 so that when the seat back frame 32 is released by the latch arrangement 40, the seat back frame 32 will automatically pivot forward around the first pivot axis 46 toward the forward folded-down position.

In order to help ensure that the seat back frame 32 pivots forward at a desired speed, the seat arrangement 10 also includes a damper arrangement 94. As shown in FIG. 5, the damper arrangement 94 is operatively disposed between the seat back frame 32 and the first mounting bracket 16. As shown in more detail in an exploded view in FIG. 6A, the damper arrangement 94 includes a damper 96 and a shaft 98. The shaft 98 is disposed through the first mounting bracket 16 along the first pivot axis 44 through two flange portions 100, 102 of the bracket 16. The shaft 98 is firmly fixed to the first seat bracket 16 for example, by placing a rivet (not shown) in one end 104 of the shaft 98, and then welding the shaft 98 to the bracket 16 at the two flange portions 100, 102. Although the shaft 98 may have a round cross section between the two flange portions 100, 102, it has at least one flat portion along its length configured for insertion into the damper 96 at a predetermined angular orientation relative to the seat back frame 32. In the embodiment shown in FIG. 6A, a portion 106 of the shaft 98 has a hexagonal cross section, and therefore has six flat sides.

Figure 6A:
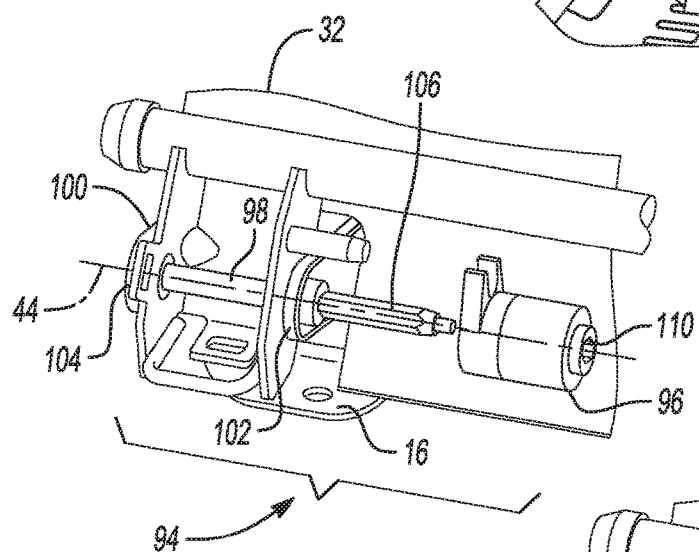
FIGS. 6A-6B show the damper arrangement in detail.
Figure 6B:
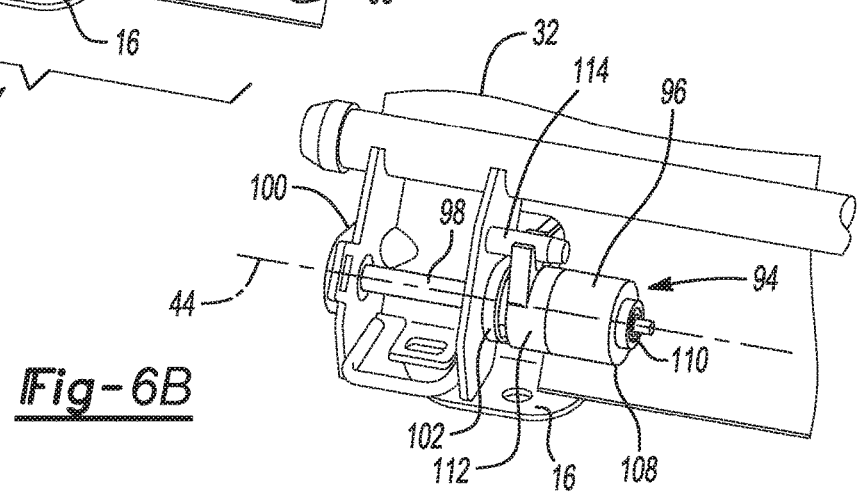

FIG. 6B shows the damper arrangement 94 in its assembled position, and in particular, the hexagonal portion 106 of the shaft 98 is inserted into the damper 96. The damper 96 includes first portion 108 that is rotationally fixed relative to the first mounting bracket 16. Specifically, the first portion 108 includes a hexagonal hole 110 configured to receive the hexagonal portion 106 of the shaft 98. Because the shaft 98 is secured to the first mounting bracket 16, the first portion 108 of the damper 96 is also rotationally fixed relative to the first mounting bracket 16. The damper 96 includes a second portion 112 that is connected to the seat back frame 32 such that it rotates with the seat bracket frame 32 when the seat back frame 32 pivots around the first pivot axis 44. As shown in FIGS. 6A and 6B, a pin 114 is securely affixed to the first mounting bracket 16, and the second portion 112 of the damper 96 is held connected to the pin 108. Therefore, as the seat back frame 32 pivots, the pin 114 rotates around the first pivot axis 44, and causes the second damper portion 112 to rotate as well. The damper 96 is effective to dampen the forward pivoting movement of the seat back frame 32, which may be particularly beneficial to dampen the torque exerted by the spring 86.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat arrangement for a vehicle, comprising:
    first and second mounting brackets configured for attachment to a vehicle body;
    a seat back frame attached to the first mounting bracket and pivotable relative to the first mounting bracket around a first pivot axis;
    a seat cushion frame pivotably attached to the second mounting bracket, and attached to the seat back frame such that the seat cushion frame and the seat back frame are pivotable relative to each other around a second pivot axis positioned above the first pivot axis when the seat back frame is in a use position; and
    a seat back latch arrangement including a striker and a latch hook operable to capture the striker at a plurality of use positions of the seat back frame and to disengage the striker to release the seat back frame to facilitate pivoting the seat back frame forward around the first pivot axis.

2. The seat arrangement of claim 1, wherein the second pivot axis is further positioned rearward of the first pivot axis when the seat back frame is in the use position.

3. The seat arrangement of claim 1, further comprising a link having a first end pivotably connected to the seat cushion frame and a second end pivotably connected to the second mounting bracket such that the seat cushion frame moves linearly relative to the second mounting bracket when the seat back frame is pivoted forward around the first pivot axis.

4. The seat arrangement of claim 1, further comprising a torsional biasing member connected to the seat back frame and the first mounting bracket and effective to pivot the seat back frame forward around the first pivot axis when the seat back frame is released by the seat back latch arrangement.

5. The seat arrangement of claim 4, further comprising a damper arrangement operatively disposed between the seat back frame and the first mounting bracket and effective to dampen forward pivoting movement of the seat back frame around the first pivot axis.

6. The seat arrangement of claim 5, wherein the damper arrangement includes a damper having a first portion rotationally fixed relative to the first mounting bracket and a second portion connected to the seat back frame to rotate with the seat back frame when the seat back frame pivots around the first pivot axis.

7. The seat arrangement of claim 6, wherein the damper arrangement further includes a shaft disposed through a portion of the first mounting bracket and a portion of the seat back frame along the first pivot axis, the shaft being rotationally fixed to the first mounting bracket and having at least one flat portion extending along a length of the shaft for insertion into the first portion of the damper at a predetermined angular orientation relative to the seat back frame.

8. The seat arrangement of claim 1, wherein the striker is attached to a frame of the vehicle and the latch hook is attached to and movable with the seat back frame, the striker including two rod portions disposed at positions corresponding to two different use positions of the seat back frame.

9. A seat arrangement for a vehicle, comprising:
    a first mounting bracket configured for attachment to a vehicle body;
    a seat back frame pivotably attached to the first mounting bracket at a first pivot axis;
    a seat cushion frame pivotably attached to the seat back frame at a second pivot axis such that the seat cushion frame moves forward in response to the seat back frame being pivoted forward around the first pivot axis; and
    a damper arrangement operatively disposed between the seat back frame and the first mounting bracket and effective to dampen forward pivoting movement of the seat back frame around the first pivot axis, the damper arrangement including a damper having a first portion rotationally fixed relative to the first mounting bracket and a second portion connected to the seat back frame to rotate with the seat back frame when the seat back frame pivots around the first pivot axis.

10. The seat arrangement of claim 9, further comprising:
    a second mounting bracket configured for attachment to the vehicle body; and
    a link pivotably connected between the second mounting bracket and the seat cushion frame such that the seat cushion frame rotates relative to the second mounting bracket when moving forward in response to the seat back frame being pivoted forward around the first pivot axis.

11. The seat arrangement of claim 9, wherein the second pivot axis is positioned above and rearward of the first pivot axis when the seat back frame is in a first use position.

12. The seat arrangement of claim 9, further comprising a seat back latch arrangement operable to maintain the seat back frame in a first use position and a second use position wherein the seat back frame is pivoted rearward from the first use position around the first pivot axis.

13. The seat arrangement of claim 12, a torsional biasing member connected between the seat back frame and the first mounting bracket and operable to automatically pivot the seat back frame forward round the first pivot axis when the seat back frame is released by the seat back latch arrangement.

14. The seat arrangement of claim 9, wherein the damper arrangement further includes a shaft disposed through a portion of the first mounting bracket and a portion of the seat back frame along the first pivot axis, the shaft being rotationally fixed to the first mounting bracket and operatively connected with the first portion of the damper at a predetermined angular orientation relative to the seat back frame.

15. A seat arrangement for a vehicle, comprising:
 a first mounting bracket configured for attachment to a vehicle body;
 a seat back frame attached to the first mounting bracket and pivotable relative to the first mounting bracket around a first pivot axis;
 a second mounting bracket configured for attachment to the vehicle body;
 a seat cushion frame having first and second ends, the second end being pivotably attached to the second mounting bracket and the first end being pivotably attached to the seat back frame at a second pivot axis positioned rearward of the first pivot axis when the seat back frame is in a use position and positioned forward of the first pivot axis when the seat back frame is in a forward folded-down position; and
 a link having a first end pivotably connected to the second end of the seat cushion frame and a second end pivotably connected to the second mounting bracket, and wherein the first end of the link is positioned above the second end of the link when the seat back frame is in the use position, and the first end of the link is positioned below the second end of the link when the seat back frame is in the forward folded-down position.

16. The seat arrangement of claim 15, wherein the first end of the seat cushion frame rotates around the first pivot axis and the second end of the seat cushion frame rotates around the second mounting bracket when the seat back frame is pivoted between the use position and the forward folded-down position.

17. The seat arrangement of claim 15, further comprising a damper having a first portion rotationally fixed relative to the first mounting bracket and a second portion connected to the seat back frame to rotate with the seat back frame when the seat back frame pivots around the first pivot axis, the damper being effective to dampen forward pivoting movement of the seat back frame around the first pivot axis.

18. The seat arrangement of claim 17, further comprising a shaft disposed through a portion of the first mounting bracket and a portion of the seat back frame and defining the first pivot axis, the shaft being rotationally fixed to the first mounting bracket and operatively connected with the first portion of the damper at a predetermined angular orientation relative to the seat back frame.

* * * * *